(12) United States Patent  (10) Patent No.: US 7,676,292 B2
Weatherhead et al.  (45) Date of Patent: Mar. 9, 2010

(54) PATTERNS EMPLOYED FOR MODULE DESIGN

(75) Inventors: N. Andrew Weatherhead, Ayr (CA);
Philip John Kaufman, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 166 days.

(21) Appl. No.: 11/864,733

(22) Filed: Sep. 28, 2007

(65) Prior Publication Data

US 2008/0097630 A1   Apr. 24, 2008

Related U.S. Application Data

(60) Provisional application No. 60/890,973, filed on Feb. 21, 2007, provisional application No. 60/862,403, filed on Oct. 20, 2006.

(51) Int. Cl.
*G06F 19/00* (2006.01)
*G05B 11/01* (2006.01)
*G06F 17/50* (2006.01)
*G06F 9/44* (2006.01)

(52) U.S. Cl. .............................. 700/97; 700/18; 700/95; 700/98; 700/118; 700/163; 717/100; 717/162; 717/163; 703/1

(58) Field of Classification Search ................... 700/18, 700/86–87, 97, 182, 95–96, 98, 118, 163; 717/100, 109, 113, 162–166; 703/1
See application file for complete search history.

(56) References Cited

U.S. PATENT DOCUMENTS

| 4,215,396 | A |  | 7/1980 | Henry et al. |
| 4,519,027 | A |  | 5/1985 | Vogelsberg |
| 4,570,217 | A |  | 2/1986 | Allen et al. |
| 4,910,691 | A |  | 3/1990 | Skeirik |
| 5,058,043 | A |  | 10/1991 | Skeirik |
| 5,068,778 | A |  | 11/1991 | Kosem et al. |
| 5,214,577 | A |  | 5/1993 | Sztipanovits et al. |
| 5,255,197 | A |  | 10/1993 | Iida |
| 5,262,954 | A |  | 11/1993 | Fujino et al. |
| 5,388,318 | A | * | 2/1995 | Petta ........................ 29/407.04 |
| 5,420,977 | A |  | 5/1995 | Sztipanovits et al. |

(Continued)

FOREIGN PATENT DOCUMENTS

EP   1770464   4/2007

OTHER PUBLICATIONS

OA mailed May 5, 2009 for U.S. Appl. No. 11/864,664, 21 pages.

(Continued)

*Primary Examiner*—Ramesh B Patel
(74) *Attorney, Agent, or Firm*—Turocy & Watson LLP; William R. Walbrun

(57) ABSTRACT

Systems and methods are provided that facilitate construction of automation applications for utilization in an industrial automation environment. A design template component can provide a design template to yield a modular, hierarchical framework for an application. Further, a design pattern table can include a library of design patterns, where the design patterns can be organized according to respective classifications. Moreover, a design pattern component can integrate a selected design pattern from the design pattern table with the design template to construct the application.

25 Claims, 12 Drawing Sheets

U.S. PATENT DOCUMENTS

| | | | |
|---|---|---|---|
| 5,450,346 | A | 9/1995 | Krummen et al. |
| 5,555,179 | A | 9/1996 | Koyama et al. |
| 5,673,194 | A | 9/1997 | Cipelletti et al. |
| 5,751,582 | A | 5/1998 | Saxena et al. |
| 5,920,717 | A * | 7/1999 | Noda .................. 717/104 |
| 5,946,212 | A | 8/1999 | Bermon et al. |
| 6,008,985 | A | 12/1999 | Lake et al. |
| 6,289,252 | B1 | 9/2001 | Wilson et al. |
| 6,397,114 | B1 | 5/2002 | Eryurek et al. |
| 6,449,624 | B1 | 9/2002 | Hammack et al. |
| 6,459,944 | B1 | 10/2002 | Maturana et al. |
| 6,501,995 | B1 | 12/2002 | Kinney et al. |
| 6,527,018 | B2 | 3/2003 | Yamauchi et al. |
| 6,662,061 | B1 | 12/2003 | Brown |
| 6,675,324 | B2 | 1/2004 | Marisetty et al. |
| 6,760,630 | B2 | 7/2004 | Turnaus et al. |
| 6,832,118 | B1 | 12/2004 | Heberlein et al. |
| 6,859,755 | B2 | 2/2005 | Eryurek et al. |
| 6,865,432 | B2 | 3/2005 | Brown |
| 6,996,741 | B1 | 2/2006 | Pittelkow et al. |
| 7,058,712 | B1 | 6/2006 | Vasko et al. |
| 7,089,155 | B2 | 8/2006 | Hegel |
| 7,089,530 | B1 | 8/2006 | Dardinski et al. |
| 7,117,504 | B2 * | 10/2006 | Smith et al. .................. 719/328 |
| 7,123,978 | B2 | 10/2006 | Hartman et al. |
| 7,149,595 | B2 | 12/2006 | D'Mura |
| 7,162,534 | B2 | 1/2007 | Schleiss et al. |
| 7,249,356 | B1 | 7/2007 | Wilson et al. |
| 7,254,457 | B1 | 8/2007 | Chen et al. |
| 7,289,861 | B2 | 10/2007 | Aneweer, et al. |
| 7,307,986 | B2 | 12/2007 | Henderson et al. |
| 7,313,453 | B2 | 12/2007 | Kline |
| 7,415,708 | B2 | 8/2008 | Knauerhase, et al. |
| 7,424,331 | B2 | 9/2008 | Patel |
| 2001/0049562 | A1 | 12/2001 | Takano et al. |
| 2002/0010908 | A1 | 1/2002 | Cheng et al. |
| 2002/0042896 | A1 | 4/2002 | Johnson et al. |
| 2003/0051071 | A1 * | 3/2003 | Stefansson et al. .......... 709/328 |
| 2003/0177018 | A1 | 9/2003 | Hughes |
| 2004/0095833 | A1 | 5/2004 | Marisetty et al. |
| 2004/0158713 | A1 | 8/2004 | Aneweer et al. |
| 2004/0172612 | A1 | 9/2004 | Kasravi et al. |
| 2004/0181294 | A1 | 9/2004 | Deitz et al. |
| 2004/0243260 | A1 | 12/2004 | Law et al. |
| 2005/0015769 | A1 | 1/2005 | Gegner |
| 2005/0227217 | A1 * | 10/2005 | Wilson ...................... 434/337 |
| 2006/0101433 | A1 | 5/2006 | Opem et al. |
| 2006/0230383 | A1 * | 10/2006 | Moulckers et al. .......... 717/120 |
| 2006/0265688 | A1 * | 11/2006 | Carlson et al. .............. 717/101 |
| 2007/0089100 | A1 * | 4/2007 | Morris et al. ................ 717/139 |
| 2007/0100486 | A1 | 5/2007 | Burda et al. |
| 2007/0101193 | A1 | 5/2007 | Johnson et al. |
| 2007/0162268 | A1 | 7/2007 | Kota et al. |
| 2007/0186090 | A1 | 8/2007 | Yu et al. |
| 2007/0261027 | A1 * | 11/2007 | Dhanakshirur et al. ...... 717/113 |
| 2007/0269297 | A1 | 11/2007 | Meulen et al. |
| 2008/0120129 | A1 * | 5/2008 | Seubert et al. ................. 705/1 |
| 2008/0126407 | A1 * | 5/2008 | Shimaoka et al. ......... 707/103 Y |
| 2008/0188960 | A1 | 8/2008 | Nixon et al. |

OTHER PUBLICATIONS

OA mailed May 6, 2009 for U.S. Appl. No. 11/864,678, 22 pages.
OA mailed May 12, 2009 for U.S. Appl. No. 11/856,563, 30 pages.

* cited by examiner

PATTERNS EMPLOYED FOR MODULE DESIGN

CROSS REFERENCE TO RELATED APPLICATIONS

This application claims the benefit of U.S. Provisional Patent Application No. 60/862,403, entitled "MODULE CONTROL AND STATE PROPAGATION," filed on Oct. 20, 2006, and U.S. Provisional Patent Application No. 60/890,973, entitled "MODULE CONTROL AND STATE PROPAGATION," filed on Feb. 21, 2007, the entireties of which are incorporated herein by reference.

TECHNICAL FIELD

The claimed subject matter relates generally to industrial control systems and more particularly to building automation applications by leveraging a design pattern table to facilitate software re-use and mitigate manual coding operations.

BACKGROUND

One type of industrial control process is referred to as a batch process, which involves subjecting raw materials to processing steps using one or more pieces of equipment to produce a "batch" of product. Efforts to automate batch processing have led to the formation of standards committees by members of industries involved in batch processing and suppliers of batch processing equipment, among others. The general purpose of these standards committees has been to define uniform standards for automated batch processing. One such standard has been promulgated by the International Society for Measurement and Control, an international organization concerned with issues of process control. This standard is entitled Batch Control Part 1: Models and Terminology and is often referred to as the ISA S88.01-1995 standard (or "S88" for purposes of this application).

The S88.01 standard defines models of equipment and procedures for use in automated batch processes, as well as terminology for use in referring to those models and their elements. The S88.01 standard defines a "batch process" as a process that leads to the production of finite quantities of material by subjecting quantities of input materials to an ordered set of processing activities over a finite period of time using one or more pieces of equipment. A "batch" is defined as the material that is being produced or has been produced by a single execution of a batch process.

Batch-processing equipment (e.g., controllable elements such as valves, heaters, mixers, and so forth) is operated according to procedures to produce a batch. Generally, such equipment is referred to synonymously as equipment, equipment modules, processing equipment, or physical elements. The procedures to operate such physical elements are often referred to by the S88.01 standard as the "procedural model." According to the S88.01 standard, the procedural model is structured as a hierarchical ranking of procedures, with the highest level encompassing each of the lower levels, the next highest level encompassing each of the levels below it, and so on. Typically, the levels of the S88.01 procedural model of a particular application are, in descending order: the "procedure;" the "unit procedure;" the "operation;" and the "phase."

The term "procedural element" generally refers to components that employ any of the levels of the S88.01 procedural model, not just to those of the "procedure" level or any other single level of the procedural model. The highest-level procedural element of interest is referred to as a procedure, which is made up of one or more unit procedures. Each unit procedure is in turn made up of one or more operations, which are each in turn made up of one or more phases. The S88.01 procedural model does not preclude definition and use of other hierarchical levels, nor does it require that each level be present in particular applications. Rather, the standard is intended to provide a broad, standardized model for describing the procedures followed in automated batch-process control.

In modern manufacturing environments, applications to control an industrial process have become exceedingly complex. For example, modules of varying types are often implemented to execute a given process associated with an application. Oftentimes, however, it is unclear which modules are to be utilized in connection the application. This can lead to selecting modules by trial and error during design time, which can substantially increase development costs, an amount of time to carry out development, complexity of development, and so forth.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

The subject innovation relates to systems and/or methods that facilitate constructing applications for utilization in an industrial automation environment. A design pattern table can be utilized to assist in selecting suitable design pattern(s) for a given application. The design pattern table can group design patterns (e.g., commonly utilized design patterns) according to various characteristics, functions, criteria, etc. According to an example, the design pattern table can graphically represent various classifications of design patterns. Additionally, each of the design patterns, for instance, can relate to fundamental elements of an application. A design template component can provide a design template that yields a modular, hierarchical framework for an application. The design template can automatically populate applicable modules into the framework. Additionally, the design template can leverage highly reusable module classes. Moreover, a design pattern component can integrate a selected design pattern from the design pattern table with a design template to construct the application (e.g., the design pattern can be applied to a design template to provide control of associated equipment). By employing the design templates and the library of common design patterns (e.g., which can automatically yield applicable modules), time for coding a particular application can be reduced. In addition, several design templates can exist as certain manufacturers can have standard design templates specific to their facilities, or specific industries can require a design template specific to a given industry. Design pattern(s) can be applied to many design templates.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
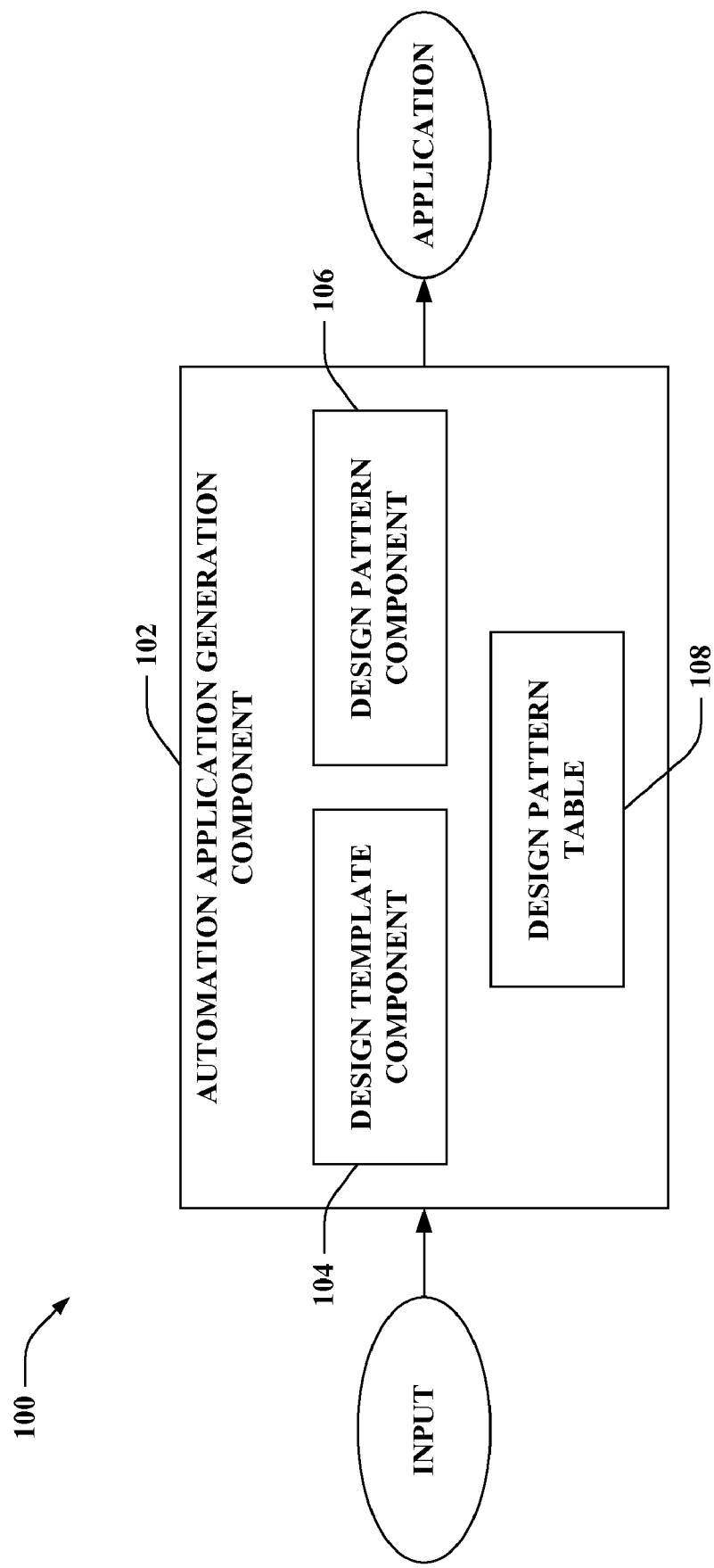
FIG. 1 illustrates an example system that enables constructing an automation application for utilization in an industrial automation environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

It is noted that as used in this application, terms such as "component," "module," "model, " and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Referring to FIG. 1, illustrated is a system 100 that enables constructing an automation application for utilization in an industrial automation environment. The system 100 includes an automation application generation component 102 that leverages an obtained input to build the automation application. The input can be obtained from any source (not shown) (e.g., the input can be automatically generated, manually provided, . . . ). The automation application that is yielded can be utilized in a manufacturing execution system (MES) to measure and/or control production activities. Moreover, the automation application generation component 102 can select various modules from a set of modules to be employed in connection with the application. By way of further illustration, the automation application generation component 102 can automatically identify and select application modules (e.g., for a system designer) relating to the application. Moreover, automatic identification of appropriate modules by utilizing the automation application generation component 102 can reduce time, cost, etc. associated with coding a particular application (e.g., in comparison to techniques whereby module(s) to be incorporated into the application are selected via trial and error and/or the application is built by a system designer writing custom code).

The automation application generation component 102 can further include a design template component 104, a design pattern component 106, and a design pattern table 108. The design template component 104 can provide a framework (e.g., design template) to be employed in connection with yielding the application. The design template can leverage a limited scope of modules to form a consistent design framework. Further, the design template can provide a modular, hierarchical framework. The design template can be built from highly reusable module classes, which for example can observe the ISA 88.01 defined module relationships. However, it can be appreciated that design templates can form any relational hierarchy. Moreover, the design template component 104 can utilize a plurality of disparate classes of design templates. Accordingly, the design template component 104 can provide a consistent framework that can thereafter be tailored (e.g., based upon the input obtained by the automation application generation component 102, by the design pattern component 106, . . . ) to create the application. Design templates (and a plurality of design templates) can be self describing, and can present contextual information regarding its interface to the design template component 104.

The design pattern component 106 can integrate a design pattern (or a plurality of design patterns) with the design template to construct the application. Moreover, the design pattern component 106 can identify, recommend, select, etc. a design pattern to be integrated with the application being generated. For instance, the design pattern component 106 can select a design pattern from the design pattern table 108 identified as being able to accomplish a particular function, task, etc. The design pattern component 106 can automatically select a design pattern to be utilized in an application being generated, for example; thereafter, the chosen design pattern can be automatically integrated into the application. According to another illustration, the design pattern component 106 can recommend a design pattern (e.g., to a developer) to be employed in the application. Following this example, the design pattern component 106 can consider contextual data, information related to the application being built, data related to the design template yielded by the design template component 104, etc. in connection with determining the recommended design pattern. Moreover, the design pattern component 106 can utilize an input from a user to select a design pattern.

Many applications can include common fundamental elements that can overlap between applications; these elements can be represented in the design patterns. Each design pattern can have various attributes; for instance, the attributes can relate to function, design, application, testing, and cost. A design pattern can include functional details that can be classified as: general description, equipment used, sequence of operation, exceptions handling, process parameters, process data, operator interactions, process inputs, and process outputs. Moreover, a design pattern can include design details (e.g., that can be defined by a project engineer) related to the following: module definition (classes and numbers), sequencing, addressing, parameter definition (extensions to the design template), and report definition (extensions to the design template). Further, the design pattern can include test scripts to test defined functionality, where the testing can relate to device sequencing, parameters, reports and/or exceptions. The design pattern can also include cost attributes such as a baseline cost (e.g., cost that represents the value of the design pattern), installation effort (e.g., based on the complexity of the design pattern), and/or extension effort (e.g., based on the defined changes to the baseline functionality provided with the design pattern). The design pattern can also include application details which allow the functional and design components to automatically generate the application.

The design pattern table 108 can include a library of the common design patterns. Moreover, the design pattern table 108 can be organized in a manner that classifies the design patterns. For example, the design pattern table 108 can classify the design patterns based upon process characteristics, design characteristics, cost characteristics, and so forth since the design patterns can represent a multitude of information. According to an illustration, the design pattern table 108 can graphically represent the classifications of the design patterns, and this graphical representation can be employed to identify, select, present recommendations, etc. of design patterns for utilization in the application being constructed. Also, the design pattern table 108 can graphically represent relationships and/or similarities between design patterns. By providing a manner for classifying design patterns, the design pattern table 108 can reduce duplication of design patterns and/or can simply identification, selection, recommendation, etc. of design patterns.

Figure 2:
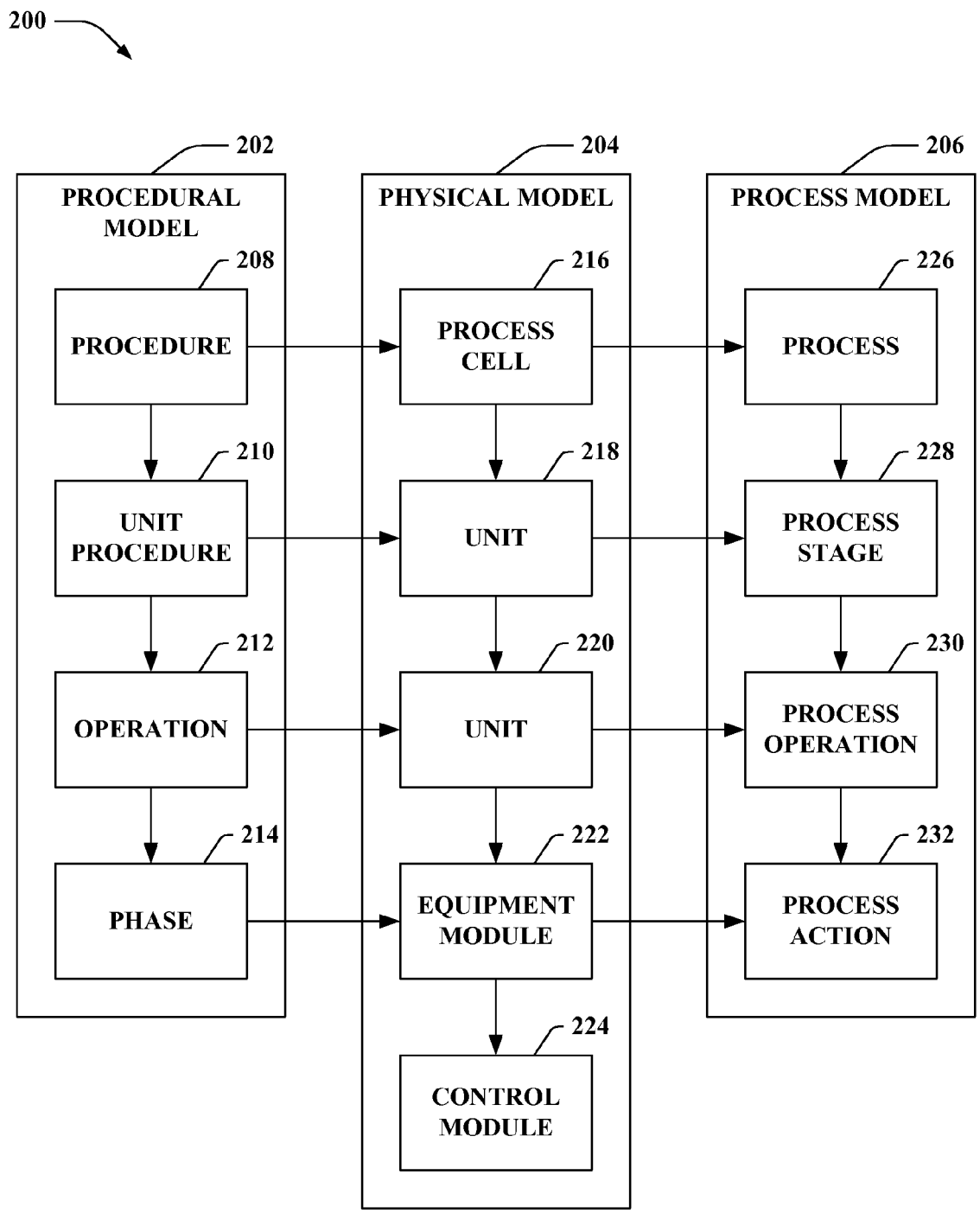
FIG. 2 illustrates an example depiction of the S88 model.

An application (e.g., discrete, continuous, batch, ...) can be functionally decomposed, and the logical point to perform the functional decomposition of an application is at the process action level (e.g., from the S88 process model described in FIG. 2). By functionally decomposing the application, process (e.g., discrete, continuous, batch, ...) capabilities of the application can be described as fundamental elements. The fundamental elements can be the design patterns included in the design pattern table 108. Thus, the design patterns can be functional blocks chosen by the design pattern component 106 while building an application.

As per ISA 88.01, the process model is achieved by applying the procedural model to the physical model. In limiting the scope of these models to procedural and physical elements required to achieve a process action, a limited scope of modules can be utilized to form a consistent design framework or design template that can be leveraged by the design template component 104.

In order to provide greater flexibility in architecting a solution, the design template allows for procedural control from a recipe or from equipment procedures. Whether acted on by an equipment operation, as in discrete manufacturing and continuous process applications, or by a recipe phase as in batching applications, an equipment phase (e.g., as defined by ISA 88.01) is the logical extension point to external procedural control from the design template.

Although different classes of design templates can exist, an interface (e.g., expected data) can be architected in a consistent manner and/or in a self describing manner. In fixing this interface, each of the fundamental elements of an application can be described as design patterns (e.g., chosen by the design pattern component 106). These design patterns in turn can be applied to design templates to provide control of associated equipment. In providing a limited series of design templates (e.g., utilized by the design template component 104) and a library of common design patterns retained in the design pattern table 108, the time required to build an application can be reduced. In addition, pre-validation of design templates and design patterns can mitigate software validation time (e.g., required within the life sciences industry, ...). It can also be appreciated that the cost estimate component of a design pattern can be updated over time by continuous feedback on the implementation and extension effort, thus dramatically improving cost estimates and lowering costs by improving the design patterns to reduce extension effort.

The automation application generation component 102, the design template component 104, the design pattern component 106, and/or the design pattern table 108 can relate to module components (not shown) and/or phase components (not shown). As will be described in more detail below, the module components or phase components can be an association of logic with one or more resources. The logic includes program code that can alter the state of a resource for example, ladder code, function block, structured text, function chart, script, JAVA, C code, and so forth. The resources are those components or elements that perform an activity in a system including equipment and personnel that perform work in a system. Other examples of types of resources include Equipment, Material, Personnel, Segments and Storage. Personnel and equipment (machines) can perform activities in a system. Resources that can perform work can be classified as active resources (e.g., CNC machine, Injection molding machine), whereas other equipment resources can be considered passive resources (e.g., sensor, material). In general, the modules hide the user from internal interfaces, messages, and logic specific to the resources yet provide standard or generic interfaces to external systems or between components.

Modules may include other modules including nested modules where standard module behaviors and attribute patterns can be represented using common data model representations for module classes, module templates and module inheritance. Module classes and templates can be maintained in libraries which facilitate access to desired system functionality and further promote system integration. Resources can have various states associated therewith such as common S88 state classifications including idle, hold, abort, run, reset, stop, restart, and so forth where the module can present logic to represent state machines that manage the state of the resource. During application, resource modules (described below) can take on the name of the resource that is the primary focus on the module. For example, an Equipment module is primarily focused on coordination of equipment but may involve personnel in the process. Similarly, a Personnel module is focused on coordination of personnel but may involve other resources in the process. A Control Module that manages a material may be referred to as a Material Control Module and so forth.

It is noted that components associated with the system 100 can include various computer or network components such as servers, clients, programmable logic controllers (PLCs), communications modules, mobile computers, wireless components, control components and so forth which are capable of interacting across a network. Similarly, the term PLC as used herein can include functionality that can be shared across multiple components, systems, and/or networks. For example, one or more PLCs can communicate and cooperate with various network devices across the network. This can include substantially any type of control, communications module, computer, I/O device, sensor, Human Machine Interface (HMI) that communicate via the network which includes control, automation, and/or public networks. The PLC can also communicate to and control various other devices such as Input/Output modules including Analog, Digital, Programmed/Intelligent I/O modules, other programmable controllers, communications modules, sensors, output devices, and the like.

The network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Referring now to FIG. 2, illustrated is an example depiction of the S88 model 200. The S88 model 200 can represent equipment and procedures for use in automated batch processes. The S88 model 200 includes a procedural model 202, a physical model 204, and a process model 206. The procedural model 202 is structured as a hierarchical ranking of procedures 208. Each procedure 208 includes one or more unit procedures 210 (e.g., each unit procedure 210 can control the function of a unit). Moreover, each unit procedure 210 can further include one or more operations 212, which in turn can include one or more phases 214. An operation 212 is a procedural element defining an independent processing activity that includes the algorithm for initiation, organization, and control of phases. The phase 214 is the lowest level in the procedural control model and can perform a process function on an equipment module and/or can coordinate control of control module(s).

The physical model 204 includes a process cell 216 that can include production and supporting equipment utilized to make a batch of product. The process cell 216 comprises one or more units 218, which can be equipment that performs specific tasks within the process. Each unit 218 further includes one or more units 220. Moreover, each unit 220 can comprise one or more equipment modules 222, each of which in turn can include one or more control modules 224. Further, the design templates described herein can map to the equipment module(s) 222 and the control module(s) 224 of the S88 model 200. As such, the design templates can provide a modular, hierarchical framework. Additionally, design modular decomposition can support the design template.

The process model 206 of the S88 model 200 includes a process 226. The process 226 includes one or more process stages 228, each of which can further include one or more process operations 230. Additionally, each process operation 230 includes one or more process actions 232. The design patterns described herein can map to the process actions 232. For example, each design pattern can provide a functional description of the corresponding process action 232. Thus, the design pattern can yield design parameters to apply to the design template.

Figure 3:
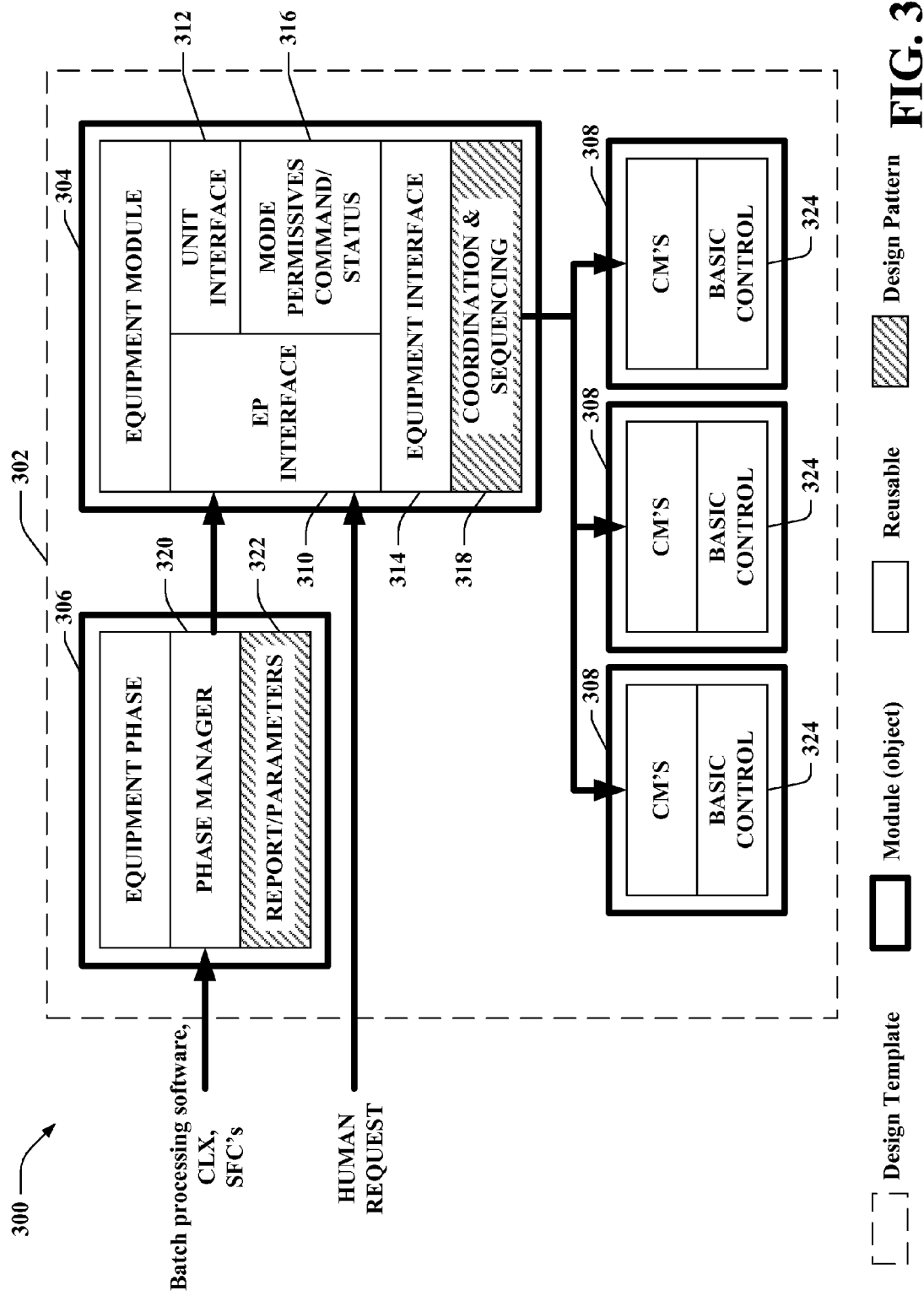
FIG. 3 illustrates an example application that can be constructed by utilizing design template(s) and design pattern(s).

Turning to FIG. 3, illustrated is an example application 300 that can be constructed by utilizing design template(s) and design pattern(s). The application 300 includes a design template 302 that provides a framework for the application 300. For example, the design template 302 can be provided, selected, built, etc. by the design template component 104 of FIG. 1. Further, the design template can be constructed from highly reusable module classes. The design template 302 can include various module(s) (e.g., equipment modules, control modules, resource modules, . . . ) and phase(s). As depicted, the design template 302 includes an equipment module 304, an equipment phase 306, and a plurality of control modules 308; it is to be appreciated, however, that the claimed subject matter is not limited to this example design template.

The equipment module 304 includes an equipment phase (EP) interface 310, a unit interface 312, an equipment interface 314, and mode data, permissive data, and command/status data 316. The EP interface 310, unit interface 312, equipment interface 314, and mode data, permissive data, and command/status data 316 can utilize reusable module classes. It is to be appreciated that the equipment module 304 is exemplary in nature and that other types of modules and/or classes are possible. The EP interface 310 provides a linkage to/from the equipment phase 306. The EP interface 310 determines how the equipment module 304 interacts with the equipment phase 306. A standard EP interface 310 can be created that applies to all equipment module classes. For instance, the EP interface 310 can provide a mechanism to pass report/parameter data between the equipment phase 306 and the equipment module 304. Additionally or alternatively, the EP interface 310 can obtain human requests.

The unit interface 312 provides a linkage to/from a respective unit (not shown) (e.g., as described in a typical S88/S95 procedure). The unit interface 312 determines how the equipment module 304 interacts with the unit. A standard unit interface 312 can be created that applies to all equipment module classes. For instance, the equipment module 304 can be aware of an associated unit such that propagation of mode and faults can traverse via the unit interface 312.

The equipment interface 314 provides linkage to/from subordinate equipment modules (not shown) and/or control modules 308. The equipment interface 314 determines how the equipment module 304 interacts with these subordinate equipment modules and/or control modules 308. A standard equipment interface 314 can be created that applies to the equipment module class.

Additionally, the mode data, permissive data, and command/status data 316 can be included in the equipment module 304. These class components can be passed to/from the respective interfaces associated with the equipment module 304.

Further, the equipment module 304 includes a coordination and sequencing design pattern 318. Coordination control and sequencing of equipment can refer to logic associated with commanding the state of subordinate equipment/control modules. Generally, coordination and sequencing is facilitated via the equipment interface 314. As opposed to conventional techniques whereby coordination and sequencing can be custom coded by a developer, the coordination and sequencing design pattern 318 can be selected (e.g., from a library of design patterns) and thereafter integrated with the template 302 to yield the application.

The equipment phase 306 can interface with the equipment module 304. It is to be appreciated that the equipment phase 306 is exemplary in nature and that other types of phases and/or classes are possible. The equipment phase 306 includes a phase manager 320. For example, the phase manager 320 can provide various interfaces (not shown) (e.g., a phase interface to link with a recipe phase to control a process, an equipment module interface to link with the equipment module 304, . . . ). By way of illustration, the phase manager 320 can obtain input from batch processing software, a ControlLogix system, sequential function charts (SFC's), and so forth. Moreover, the phase manager 320 can be built from reusable module classes. The equipment phase 306 additionally includes a report/parameters design pattern 322. For instance, the report/parameters design pattern 322 can include functional details, design details, testing scripts, cost data, and so forth to carry out a process action. According to another illustration, the report/parameters design pattern 322 can deliver extensions to variables (e.g., parameters and report variables) included as part of the design template 302.

Further, each of the control modules 308 can include basic controls 324. The basic controls 324 can be included in the design template 302 and can be built from reusable module classes.

According to another example, disparate design templates similar to the design template 302 can be employed. For instance, a similar MES design template can be utilized that allows the design patterns to be extended to cover certain related details with the information layer; however, the claimed subject matter is not so limited.

Figure 4:
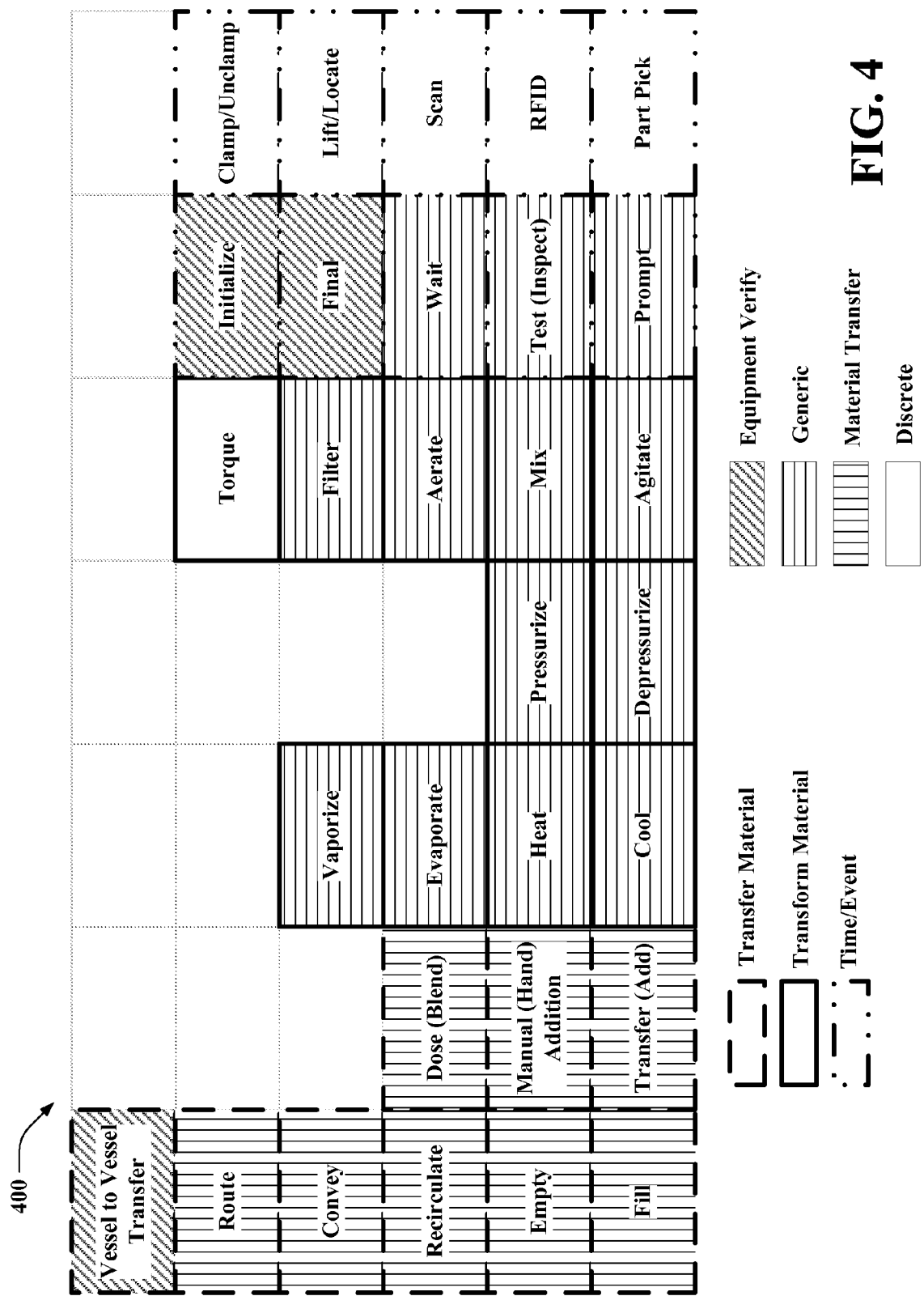
FIG. 4 illustrates an example table of design patterns.

With reference to FIG. 4, illustrated is an example table 400 of design patterns. The design patterns are organized within the table 400 based upon various functions, criteria, etc. For instance, the design patterns can represent a multitude of information, and therefore, the design patterns can be classified in a number of manners. The design pattern table 400 can graphically depict relationships between design patterns, design pattern similarities and/or differences, costs, and so forth. The table 400 can include all of the design patterns in a library of design patterns or a subset thereof. It is to be appreciated that the design pattern table 400 is provided as an example, and the claimed subject matter is not so limited; for example, any disparate design patterns can be included in a similar design pattern table, a design pattern table need not include one or more of the design patterns of table 400, and/or any differing type of organization, classification, etc. can be employed therewith.

According to an example, the design patterns can be classified based upon process characteristics, design characteristics, and/or cost characteristics. The process characteristics can relate to a type of process function provided by the design pattern such as, for instance, whether the design pattern pertains to transferring material, transforming material, or a time/event. As illustrated in the table 400, nearby columns can include design patterns classed in a particular process function type, while design patterns in the same column can be most similar. According to the example shown, the design patterns for transferring material are included in the two left columns (e.g., vessel to vessel transfer, route, convey, recirculate, empty, fill, dose (blend), manual (hand) addition, and transfer (add)). Further, the design patterns pertaining to transforming material are included in the middle three columns of the table 400 (e.g., vaporize, evaporate, heat, cool, pressurize, depressurize, torque, filter, aerate, mix, and agitate). Meanwhile, the design patterns that relate to a time/event are included in the two right columns of the table 400 (e.g., initialize, final, wait, test (inspect), prompt, clamp/unclamp, lift/locate, scan, RFID, and part pick).

Further, the design characteristics can characterize design details associated with the design patterns. In the depicted example, the shading represents the design characteristic category. For instance, the design characteristics can relate to equipment verification, generic, material transfer, and discrete. Following the illustrated example, design patterns related to equipment verification can include vessel to vessel transfer, initialize and final. Generic design patterns can include vaporize, evaporate, heat, cool, pressurize, depressurize, filter, aerate, mix, agitate, wait, test (inspect), and prompt. Design patterns pertaining to material transfer can include route, convey, recirculate, empty, fill, dose (blend), manual (hand) addition, transfer (add). Additionally, discrete design patterns can include torque, clamp/unclamp, lift/locate, scan, RFID, and part pick.

The table 400 can also include information related to cost characteristics. Although not shown, it is contemplated that a numeric value for each design pattern can be included in the table 400 that indicates a base line cost of the design pattern. Pursuant to a further example, the table 400 can include a numeric value (not shown) indicating the effort (e.g., man hours) to implement the design pattern; this cost can be referred to as implementation effort.

Figure 5:
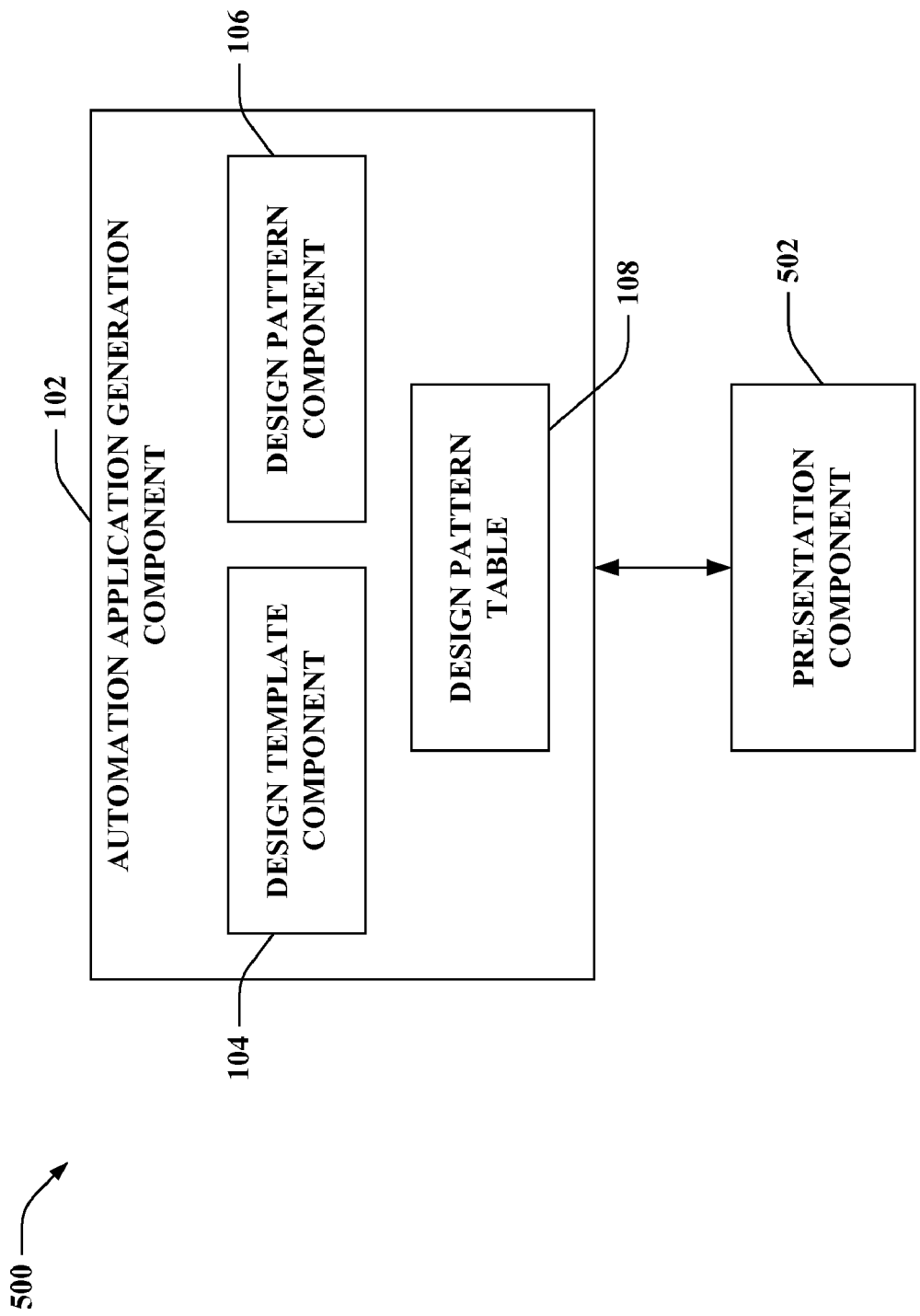
FIG. 5 illustrates an example system that enables building an automation application by utilizing a design template framework with a library of design patterns.

FIG. 5 illustrates a system 500 that enables building an automation application by utilizing a design template framework with a library of design patterns. The system 500 includes the automation application generation component 102, which further comprises the design template component 104, the design pattern component 106, and the design pattern table 108. The system 500 further includes a presentation component 502 that provides various types of user interfaces to facilitate interaction between a user and any component associated with the automation application generation component 102. As depicted, the presentation component 502 is a separate entity that can be utilized with the automation application generation component 102. However, it is to be appreciated that the presentation component 502 and/or similar view components can be incorporated into the automation application generation component 102 and/or a stand-alone unit. The presentation component 502 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the automation application generation component 102. By way of further illustration, the design pattern table 108 can be displayed to and/or interacted with by the user to enable constructing an application with the automation application generation component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 6:
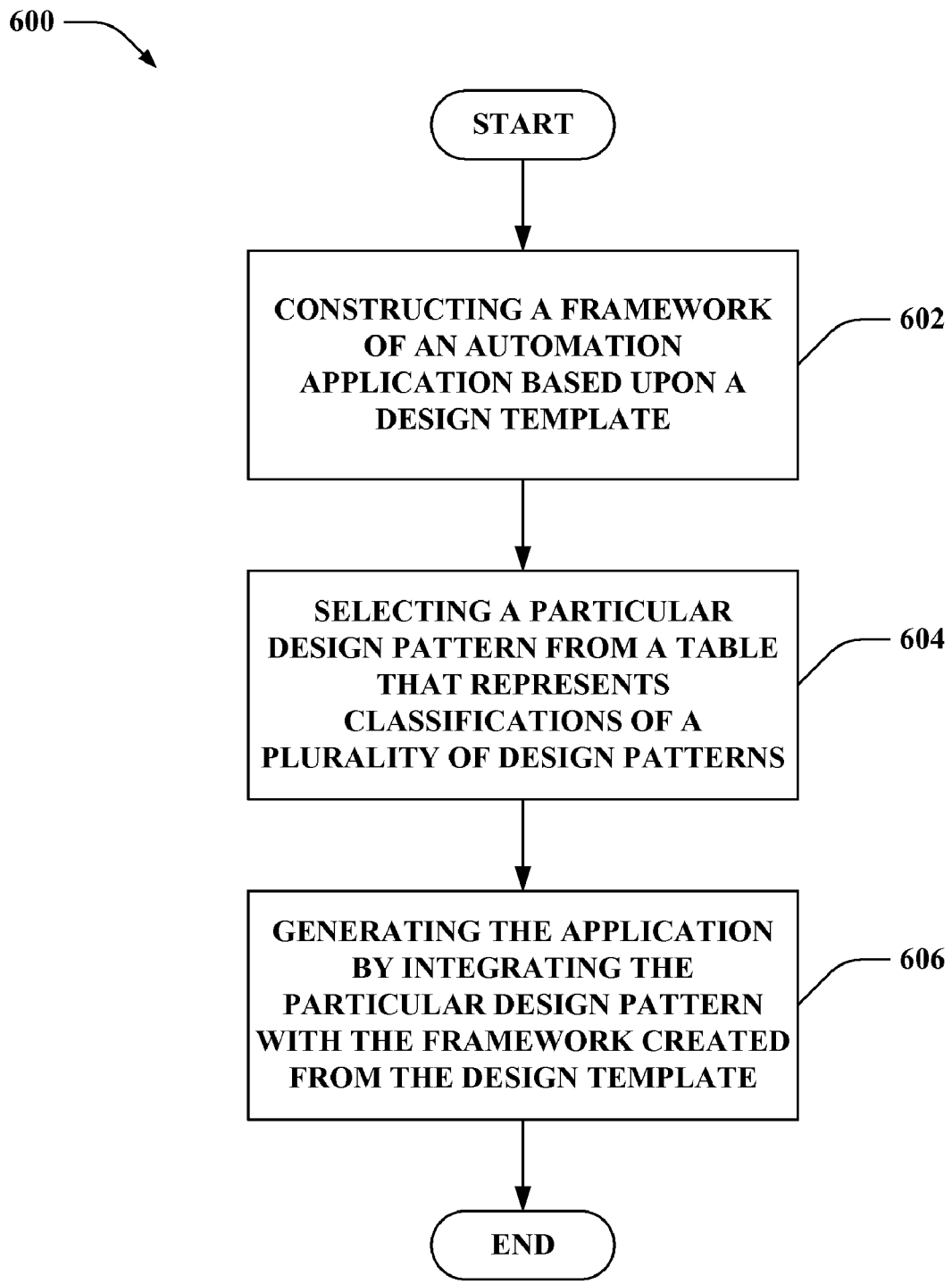
FIG. 6 illustrates an example methodology that facilitates building an automation application for utilization in an industrial automation environment.
Figure 7:
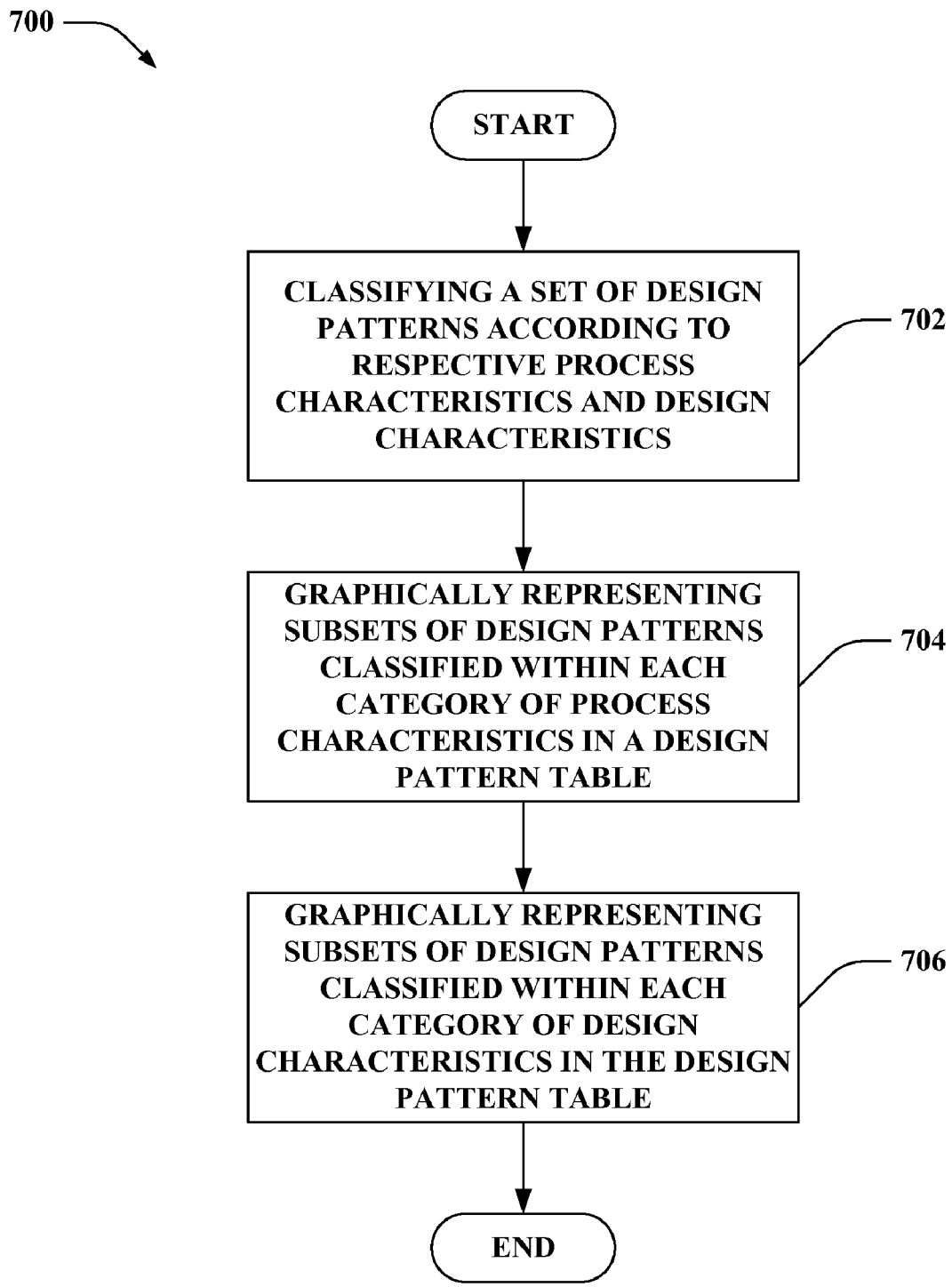
FIG. 7 illustrates an example methodology that facilitates rendering a design pattern table that can be utilized to construct an automation application.

Referring to FIGS. 6-7, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 6, illustrated is a methodology 600 that facilitates building an automation application for utilization in an industrial automation environment. At 602, a framework of an automation application can be constructed based upon a design template. For example, the design template can provide a consistent design framework. Moreover, the design template can be built from reusable module classes (e.g., which can observe the ISA 88.01 defined module relationships). Additionally, the design template can map to equipment module(s) and/or control module(s) in the S88 model. At 604, a particular design pattern from a table that represents classifications of a plurality of design patterns can be selected. The table can include a library of common design patterns. For instance, the design patterns can describe fundamental elements of the application. Additionally, the particular design pattern can automatically be selected and/or manually be selected (e.g., in response to a user choice, . . . ). By way of further illustration, design pattern recommendations can be yielded, and the recommendations can prompt user selection (or non-selection). Moreover, the table can be rendered to display relationships between the plurality of design patterns. At 606, the application can be generated by integrating the particular design pattern with the framework created from the design template. For example, the design pattern can be utilized to provide information utilized to carry out a process action as opposed to a developer having to code such information. Further, a cost estimate, a functional specification, design documentation, a test specification, validation documentation, etc. can be generated for the application.

Now turning to FIG. 7, illustrated is a methodology 700 that facilitates rendering a design pattern table that can be utilized to construct an automation application. At 702, a set of design patterns can be classified according to respective process characteristics and design characteristics. For example, each design pattern can be determined to be associated with a particular process characteristic (e.g., process function) such as transferring material, transforming material, or time/event. Moreover, each design pattern can be categorized according to design characteristics (e.g., equipment verify, generic, material transfer, discrete). At 704, subsets of design patterns classified within each category of process characteristics can be graphically represented in a design pattern table. At 706, subsets of design patterns classified within each category of design characteristics can be graphically represented in the design pattern table. Accordingly, relationships between design patterns can be depicted in a rendered design pattern table. Moreover, one or more design patterns can be selected based upon the relationships illustrated in the rendered design pattern table.

Figure 8:
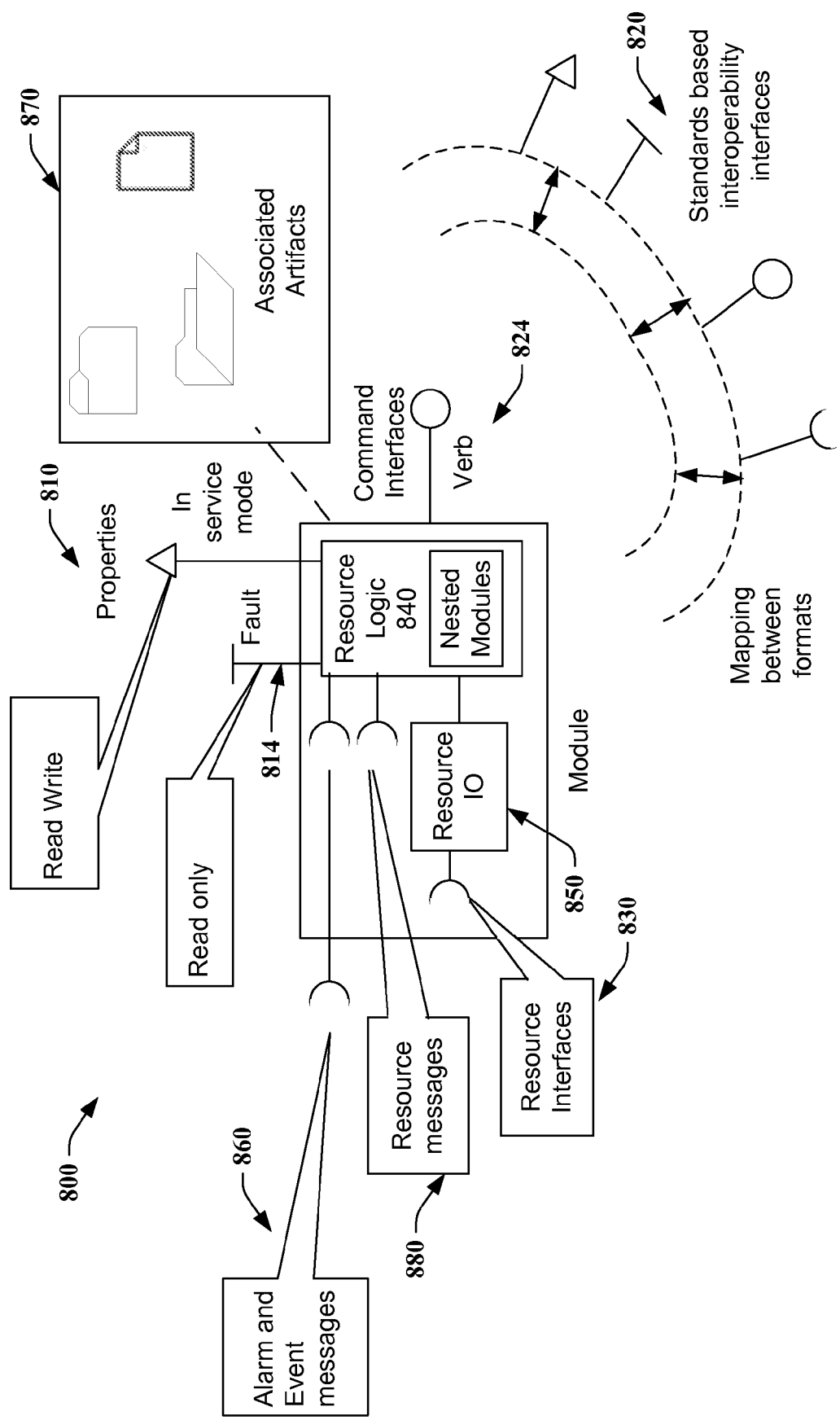
FIG. 8 is a diagram illustrating module attributes.

Referring now to FIG. 8, module attributes 800 are illustrated. The attributes 800 depicted in FIG. 8 include a common (or exemplary) representation that can be modules from modules. Generally, a set of standard attributes can be determined that are common to all modules. Similarly, for other types of modules described below, additional standard attributes can be defined. An example of a property 810 available on modules includes attributes such as Fault and Status at 814. Active resource modules (e.g., equipment and personnel) can support additional properties 810 such as available/unavailable.

Attributes presented below are represented as associations from the module to objects which may be internal in a common data model or elsewhere (e.g., CAD Files). At 820, standard public interfaces can be provided. These interfaces 820 publish verbs 824 that are available to external systems and are documented activities that hide the complexity of the underlying code used to implement the interface. Interfaces 820 can be associated with various common usage scenarios. For example, interfaces 820 can be used as access points that can hook in real time diagnostics, security and so forth.

Public verbs 824 initiate an action within the module. The activity is described to clients of the interface 820. The implementation is considered private and is not presented to clients. Examples can include Open, Stop, Abort, Shut, and so forth. A data value property 810 provides public access to information that is used by the module during its operation and can be provided by request values and/or internal values (or an equivalent). The association of logic to transfer request values to internal values and vice versa are referred to as get and set logic for the value. It is noted that in a controller, if there is not a set routine to transfer request values to internal values, the internal value can overwrite the request value on the next scan providing read only capability.

In general, the properties 810 can be considered in at least two classifications. States have special significance for production systems and can have a specific set of values that can be represented by range or enumeration. A state can represent the current status of the primary resource being encapsulated by the module e.g., Percent open, Mode, Service (in, out), and so forth. Information that is used by the module during its operation includes access to data that is provided by interfaces 820, e.g., Conversion Map, Name, Description, expiry date, personnel contact information. Some properties 810 can be common to all instances of resource modules (e.g., scanned copy of resource specification documents), whereas other properties 810 are specific to each module instance (e.g., Status, percent open).

At 830, internal resource interfaces include interfaces from logic 840 in the module to the resource being managed at 850, where the logic includes code and/or configuration(s) that process a command and/or update state and data properties. In some cases, this can be hardware such as I/O interfaces, or in other cases it is to subordinate resource control modules that have direct interfaces. Some examples include I/O mapping, material management logic routines, and so forth. These interfaces 830 are internal to the module and can enable the public interfaces 820 and properties 810 to be the boundary to other system components. Modules that wrap different resources but support the same public properties/interfaces can be exchanged without disrupting interfaces to other components. Generally, I/O mapping and system messaging interfaces are exposed during deployment bind processes. When bound, external interfaces 820 to runtime systems may then consider these interfaces as internal.

At 860, alarm and event messages can be provided which include messages that can be exposed as runtime messages visible to external systems during the execution of the module. This includes alarms and events explicitly coded by the developer and system messages promoted to be visible by external systems. At 870, one or more artifacts include information that document the operation and structure of the resource such as, for example, wiring diagrams, warranties, payroll, parts supplier information, and so forth. Visualization aspects include associated graphics that present the resource state and properties to applications interacting with the resource. For example, the artifacts can include faceplates, icons, state overlays, edit dialogs, help files, etc. At 880, system messages allow modules to listen for and publish data model messages to external components. Inbound messages are typically used to manage modules (configure, initialize, propagate properties, and so forth) and publish messages on module activity (resource state, data model messages, and so forth).

Figure 9:
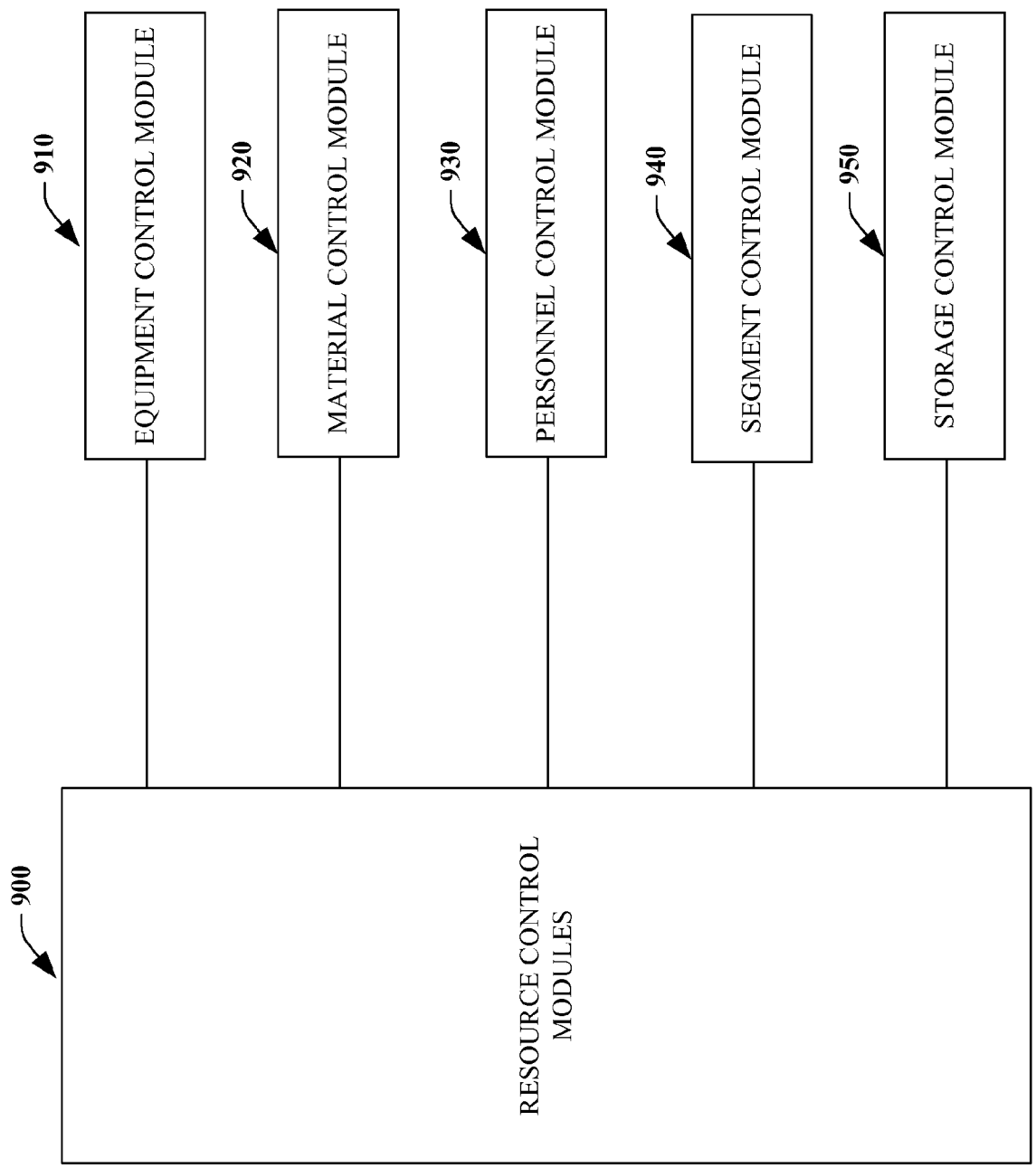
FIG. 9 is a diagram illustrating example resource control modules.

Turning to FIG. 9, example resource control modules 900 are illustrated. In general, resource control modules 900 provide simple control of one or more resources. The resource control module (RCM) 900 represents the logic to manage the state or data of the resource and may include other resource control modules to achieve its respective functionality. The RCM 900 provides public interfaces via actions and properties. In some cases, an action may be a simple bit value or a request value that is interfaced to internal values in the module and in other cases more complex logic can be provided. The RCM 900 can include other resource control modules and may promote a command to be represented as segment resource control interface. Example forms of the RCM 900 include the following.

At 910, an Equipment Control Module (Common name="Control Module") CM can be provided, which can be the simplest form of basic regulatory control of equipment. The equipment control module 910 can encapsulate the equipment and its control such as control of values, drives, and so forth. At 920, a Material Control Module (MCM) can be provided. Management of material resource instances which are represented as sub-lots including change in location, quality status, availability, order status, logic that can be performed on material sub-lots, generation of material events such as consumed, produced and moved events, sub-lot combination, expiry dates, and so forth.

At 930, a Personnel Control Module (PCM) is provided. This includes management of individual people such as Active, Idle, Break states directly or via shift schedules. This also includes data associated with people such as shift time patterns, for example. Other attributes that may be managed by PCM 930 are a person's location in a plant (GPS), qualification checks, or current assignment, for example. At 940, a Segment Control Module (SCM) includes manipulation of simple segment tasks such as piping paths, AGV paths, device state machines, robotic sequences and so forth. The SCM 940 typically performs an action on one segment such as next step to execute after the current step. At 950, a Storage Control Module (STGCM) includes manipulation of simple storage logic such as buffer capacity and ordering into and out of a queue for the respective storage unit or requirement.

Figure 10:
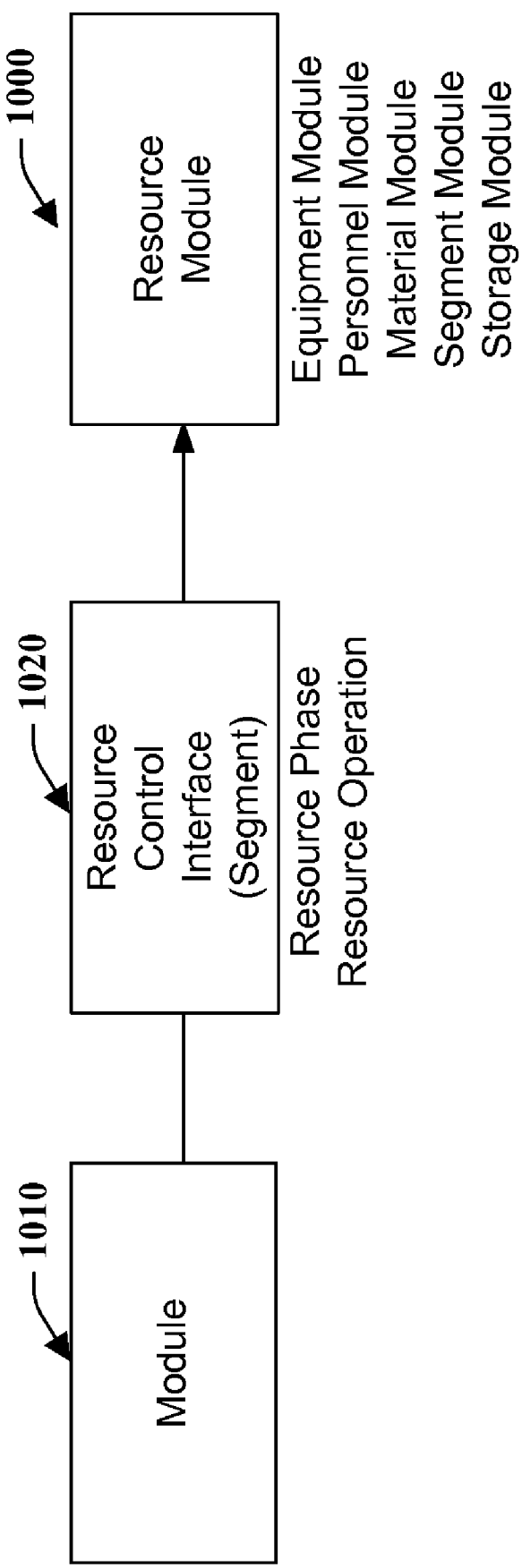
FIG. 10 is a diagram illustrating a resource module.

FIG. 10 illustrates a resource module 1000 for an industrial control system. Resource modules 1000 extend resource control modules described above to enable coordination of resources (e.g., equipment, people, modules, . . . ). As shown, the resource control module 1000 includes a module 1010 and a resource control interface 1020. Resource modules 1000 are also able to represent more complex activities than resource control modules. For example, resource modules 1000 may include other resource control modules at 1010 and/or other resource modules. For example, an equipment module may leverage a subordinate material control module to represent material handling aspects or a segment module to solicit an electronic signature.

Before proceeding it is noted that other types of modules are possible other than those shown. For instance, a configuration module may include management definitions and configuration of resources—personnel, material, equipment, segments, storage, and so forth. Another type of module includes nested modules where a module references other modules. These modules may be children of a parent module or shared from one module to another. Resource modules may include resource control modules; however, resource control modules should not include resource modules. Modules can include modules focused on other resource types; for example, an equipment module may include equipment modules and material modules.

Figure 11:
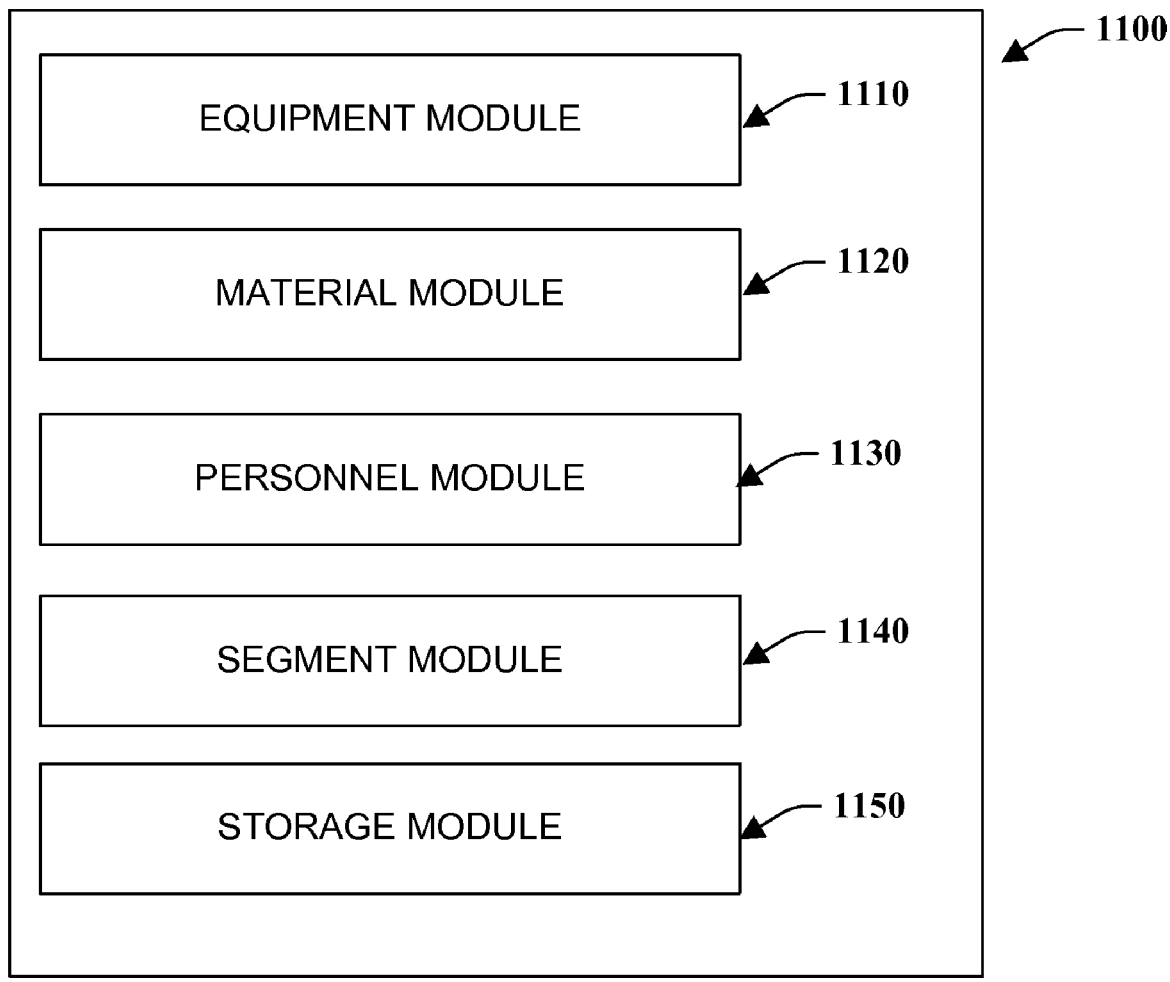
FIG. 11 is a diagram illustrating example resource modules.

FIG. 11 illustrates example resource modules 1100 for an industrial control system. At 1110, an Equipment Module provides coordination of equipment modules and equipment control modules to perform a process-orientated task independent of specific material e.g., In-feed, AGV controller, Conveyor, and so forth. At 1120, a Material Module provides coordination of material modules and material control modules to perform material focused tasks e.g., material reservation, provision, material mass balance calculation, bill of material management, work order management, and so forth. At 1130, a Personnel Module provides coordination of personnel modules and personnel control modules to perform personnel focused tasks e.g., electronic signature collection, security validation, certification validation, manual control interactions, and so forth.

At 1140, a Segment Module provides coordination of segment modules and segment control modules to execute sequences of tasks represented by segments. Segments define resource requirements and ordering that can represent most production and process activities. This module provides access to more complex tasks that require specific sequences to be followed e.g., Process Analytics Technology (PAT) integration, electronic signatures collection, defect, process deviation and fault recovery processing. The segment module 1140 may also construct a sequence to be followed that can be applied as manual, automatic or semi automatic sequences (e.g., route, recipe execution). At 1150, a Storage Module provides coordination of storage related activities, allocation of storage to requesters, modeling of inventory calculations and so forth. This also includes interaction with higher-level systems that manage storage and inventory information.

Figure 12:
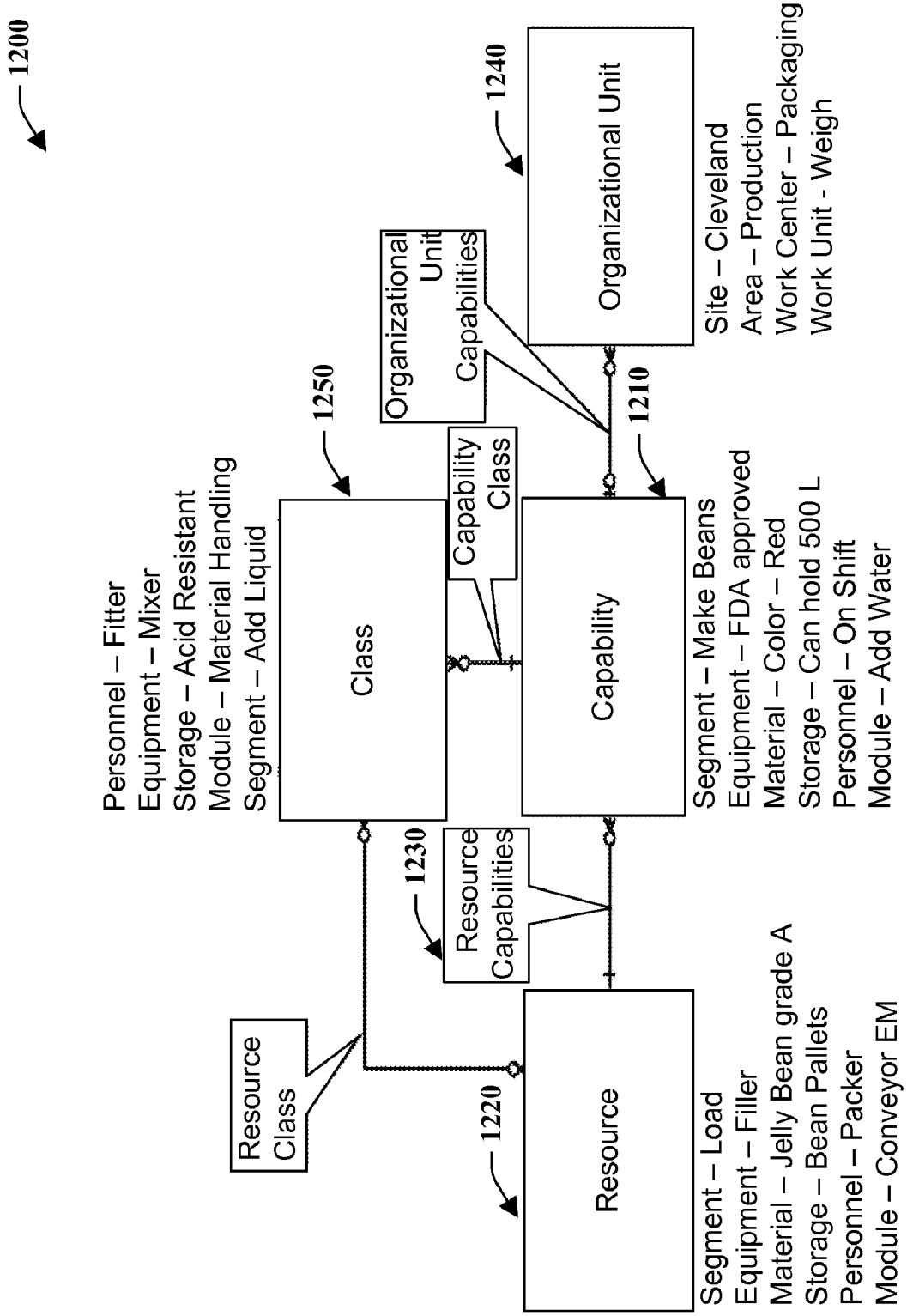
FIG. 12 is a diagram illustrating a resource control model.

FIG. 12 illustrates an example resource control model 1200 for an industrial control system. Resource Control Interfaces are the interfaces exposed to production management systems for resource binding and arbitration purposes. The interfaces are elements of the resource control model 1200 including procedures, operations or phases. These interfaces are made available by exposure via one or more capabilities 1210 described below. Procedures, operations and phases depicted in this model 1200 are commonly referred to in association with their module resource type such as Equipment Phase, Personnel Phase, Segment Phase, or as a generic Resource Phase where no specific resource module is required. Production management including Product Production Rules (production route or control recipe) physically bind to (reference) resource control phases to perform work. The availability of other resources 1220 such as material, equipment, personnel, etc. are considered during the binding process of product production rules to work centers (e.g., production lines, process cells, . . . ). These selection processes evaluate resource capabilities to locate the appropriate resource for the task.

Resource capabilities 1210 include the resource 1220 required to perform work in a production system. Consequently, resources 1220 are at the center of efficiency, capacity, scheduling and arbitration considerations. A resource's ability to work or be available to allow work to commence is represented as resource capability at 1230. The existence of capability 1230 associated with a resource 1220 does not make the resource available for production; the resource's capability 1230 is associated with organizational units 1240 that can support the respective resource capability. For example, an operator (personnel resource) may have qualifications for a Mixer in line 1, where this qualification capability is only in effect with that specific mixer unless explicitly directed. Resource arbitration algorithms can search for resource capabilities 1230 in the scope of organizational units 1240 they are to be executed within.

Resources 1220 publish capabilities to organizational units 1240 for use by system processes in a given scope. Modules are a type of resource and can be accessed directly by published capabilities 1210. However, a more common interface to Resource Modules is via verbs that are supported by the Resource Module noted above. These verbs are Resource Control elements (phases, operations, procedures . . . ) which are segments. A published capability of a resource module is typically one of the phases supported the module. Resource control interfaces are published (made available) to the outside world as capabilities 1210. Resource modules provide the ability to promote a command to become a resource control interface.

Some process control systems are built using only Resource control modules (especially control modules). Examples of this are continuous processes such as petrochemical and heavy chemical plants. In order to initiate, the process takes a plant up to its running state or makes a change to the state of a series of commands that are initiated and coordinated to achieve the new state. It is also possible to promote commands from resource control modules to appear as capabilities that can be accessed as "tuning knobs" for tweaking the system between system states. As shown in the model 1200, the resource 1220 and capability can be associated with a higher-level class or abstraction 1250.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that enables constructing an automation application for utilization in an industrial automation environment, comprising:
   a design template component that provides a design template to yield a modular hierarchical framework for an application, the design template built from reusable module classes that observe module relationships defined by a hierarchical procedural model of an industrial process;
   a design pattern table that includes a library of design patterns organized according to types of industrial process functions provided by each of the design patterns; and
   a design pattern component that integrates a selected design pattern from the design pattern table with the design template to construct the application.

2. The system of claim 1, wherein the reusable module classes are comprised of one or more disparate design templates.

3. The system of claim 1, wherein the design template provides a consistent framework that is tailored using one or more selected design patterns to create the application.

4. The system of claim 1, wherein the design pattern component automatically selects the design pattern from the design pattern table based on information relating to an automation application being generated.

5. The system of claim 1, wherein the design pattern component recommends a subset of the design patterns from the design pattern table based at least on a task required of the automation application, and accepts a user input selecting a particular design pattern from the subset for integration with the design template.

6. The system of claim 1, wherein the design pattern component accepts a user input selecting a design pattern from the library of design patterns for integration with the design template.

7. The system of claim 1, wherein each of the design patterns has associated attributes related to one or more of a function, a design, testing, or a cost.

8. The system of claim 1, wherein the design pattern table classifies each of the design patterns based upon process characteristics, design characteristics, and cost characteristics.

9. The system of claim 8, wherein the design pattern table graphically depicts the design patterns organized according to process, design, and cost classifications.

10. The system of claim 8, wherein the design pattern table graphically represents relationships and similarities between the design patterns as determined by the classifications.

11. The system of claim 1, wherein the selected design pattern is applied to the design template to yield an automation application that provides control of associated equipment.

12. The system of claim 1, wherein the design template and each of the design patterns are pre-validated.

13. The system of claim 1, wherein the design template maps to at least one equipment module and at least one control module within the hierarchical procedural model of the industrial process.

14. The system of claim 1, wherein each of the design patterns maps to a respective process action within the hierarchical procedural model of the industrial process.

15. A method that facilitates building an automation application for utilization in an industrial automation environment, comprising:
    constructing a framework of an automation application based upon a design template, the design template built from reusable module classes that observe module relationships defined by a hierarchical procedural model of an industrial process;
    selecting a design pattern from a table having a plurality of design patterns organized according to a type of industrial process function provided by each design pattern; and
    generating the application by integrating the selected design pattern with the framework created from the design template.

16. The method of claim 15, further comprising:
    generating a cost estimate for the automation application;
    generating a functional specification for the automation application;
    generating design documentation for the automation application;
    generating a test specification for the automation application; and
    generating validation documentation for the automation application.

17. The method of claim 16, wherein the cost estimate is generated based on one or more cost attributes associated with the selected design pattern, the one or more cost attributes including at least one of a baseline cost representing a value of the selected design pattern, an installation effort representing a complexity of the selected design pattern, or an extension effort representing changes to a baseline functionality of the selected design pattern.

18. The method of claim 15, further comprising mapping the design template to at least one equipment module and at least one control module in the hierarchical procedural model of the industrial process.

19. The method of claim 15, wherein each of the plurality of design patterns represents a fundamental application element.

20. The method of claim 15, further comprising automatically selecting a design pattern for integration with the framework based on an ability of the selected design pattern to accomplish a particular automation function within the automation application.

21. The method of claim 15, wherein selecting the design pattern further comprises:
    determining a recommended subset of the plurality of design patterns based at least on information related to the automation application;
    presenting the recommended subset to a user; and
    obtaining a user input pertaining to a selection of a design pattern from the subset.

22. The method of claim 15, further comprising rendering the table to display relationships and similarities between the plurality of design patterns.

23. The method of claim 22, wherein rendering the table further comprises:
    classifying each of the plurality of design patterns according to respective automation process characteristics and design characteristics;
    graphically representing subsets of the plurality of design patterns as being classified within each of a set of categories of automation process characteristics in the table; and
    graphically representing subsets of the plurality of design patterns as being classified within each of a set of categories of design characteristics in the table.

24. The method of claim 22, further comprising obtaining a user input related to a manual selection of a design pattern from the rendered table.

25. A system that enables constructing an automation application for employment within an industrial automation environment, comprising:
    means for building a consistent framework of an application based upon a design template that leverages reusable module classes that observe module relationships defined by a hierarchical procedural model of an industrial process;
    means for identifying a particular design pattern from a table containing a plurality of design patterns organized according to a type of industrial process function associated with each design pattern;
    means for incorporating the particular design pattern with the consistent framework to yield the application; and
    means for generating a cost estimate to design and build the application.

* * * * *